May 8, 1962 E. F. WEBB 3,033,274
FUEL RESERVE SYSTEM
Filed Feb. 9, 1960
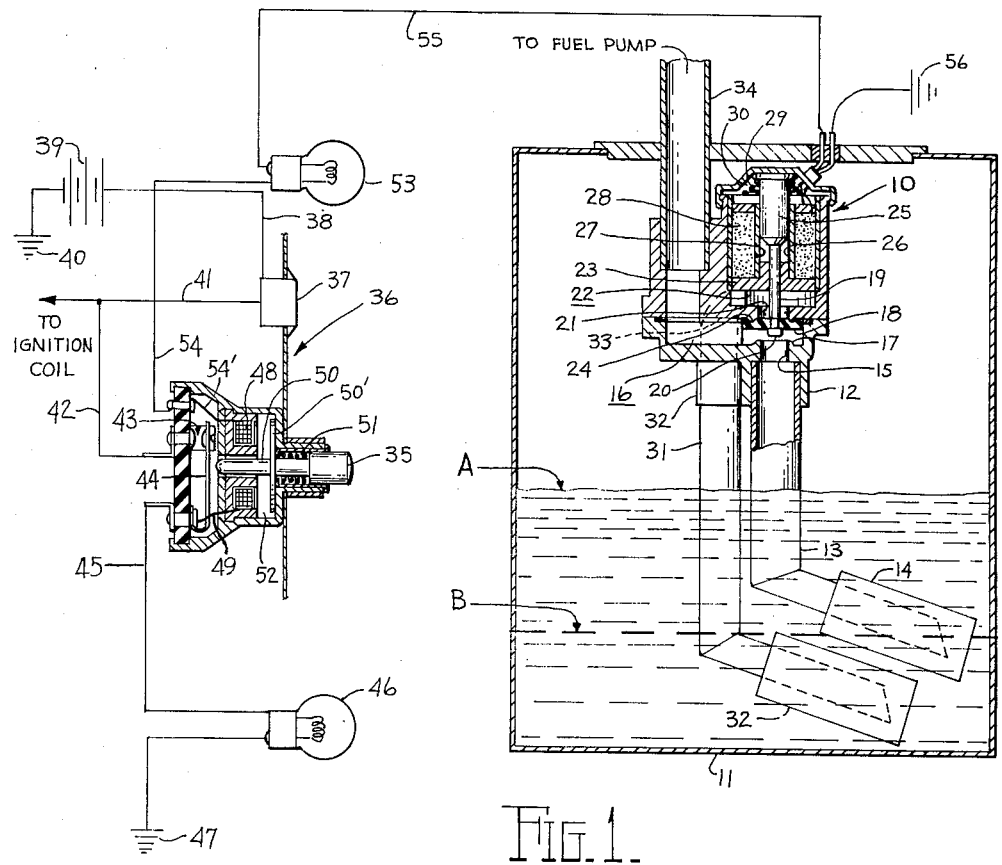
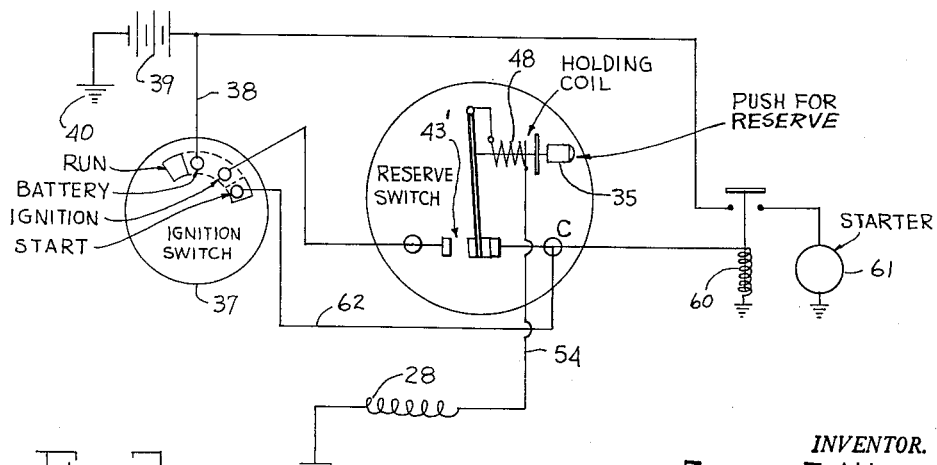
INVENTOR.
EDMOND F. WEBB
BY
ATTORNEYS

United States Patent Office 3,033,274
Patented May 8, 1962

3,033,274
FUEL RESERVE SYSTEM
Edmond F. Webb, Franklin, Mich., assignor to R. L. Kuss & Company, Inc., Findlay, Ohio, a corporation of Ohio
Filed Feb. 9, 1960, Ser. No. 7,600
2 Claims. (Cl. 158—46.5)

This invention relates to an improvement in fuel systems, and, more particularly, to a novel fuel system for use in automobiles or other internal combustion engine vehicles in which a fuel reserve is established.

Numerous fuel reserve systems incorporating varied structures and modes of operation have been suggested in the past. For example, systems involving the use of more than one fuel supply tank, one being employed during normal operation and the other as a reserve, have been utilized. Others, in which only one tank is employed and wherein a single filter or strainer member extends upwardly therein and encloses two fuel intake tubes at different tank levels have also been utilized. Each of these systems has been found to have serious drawbacks. For example, the systems employing more than one fuel supply tank are extremely bulky and cumbersome necessitating a large area for installation which, of course, is undesirable in view of the present trend towards compact automobiles, and additionally, because of their relative complexity, are prohibitively expensive. The single strainer member systems have the disadvantage, in the event the strainer becomes clogged, of being impossible to operate.

It is, therefore, the principal object of the invention to provide an improved fuel reserve system.

It is another object of the invention to provide an automobile fuel system in which a fuel reserve is provided without necessitating the use of a separate, supplemental fuel tank, which fuel reserve can be simply and effectively employed by the driver or operator of the automobile.

More particularly, it is a further object of the invention to provide an automobile fuel system in which dual filter intake tubes extend into a fuel supply tank, one of such intake tubes extending to a predetermined lower level in the supply tank than the other, and wherein both of the intake tubes are operatively associated with a single solenoid actuated valve means which serves to selectively establish connection of one of the intake tubes to the main fuel line of the automobile.

It is a further object of the invention to provide a novel fuel reserve system for automobiles and the like including dual fuel intake tubes located in the fuel tank, one of such tubes being employed when utilizing the reserve fuel supply and the other or main tube being employed during normal operation, wherein means are provided, if use is being made of the reserve fuel supply, to automatically reestablish the employment of the main intake tube upon the shutting off of the ignition switch, as for example, when refueling.

Another object of the invention is to provide an improved fuel system which is easily adaptable for installation in past and present model automobiles.

A further object of the invention is the provision of a reserve fuel system for use in automobiles and the like in which warning means are operatively associated with the system in such a manner as to continually inform the driver or operator of the automobile when the fuel reserve is being employed.

It is a still further object of the invention to provide an automobile fuel reserve system having dual fuel intake tubes opening into the fuel supply tank and a solenoid actuated valve operatively associated therewith, in which means are provided for effecting periodic operation of the reserve system to preclude the danger of the valve sticking due to long periods of non-use.

Other objects and advantages will in part be apparent, and will in part appear hereinafter.

For a better understanding of the nature and objects of the invention, reference should be had to the following detailed description and accompanying drawings, in which:

FIG. 1 is a schematic illustration, with certain parts in section, and certain parts broken away, of a fuel reserve system embodying the present invention; and FIG. 2 is a schematic showing of an optional circuit which is adapted for connection with the fuel reserve system illustrated in FIG. 1.

Referring more particularly to the drawings, a valve housing, indicated generally at 10, is shown disposed in a conventional automobile fuel supply tank 11. A collar 12 is formed on one side of the bottom valve housing 10 and is adapted to fixedly receive one end of a fuel intake or filter tube 13. A filter 14 is disposed about and fixed in any suitable manner to the lower end of the filter tube 13 so as to cover the opening thereof into the fuel tank.

The tube 13 communicates at its upper end with a passageway 15 located in the valve housing 10, which passageway in turn communicates at its upper end with a discharge chamber 16. A small shoulder 17 is provided in the inner surface of the valve housing 10 surrounding the entrance of the passageway 15 into the discharge chamber 16 and serves as a lower valve seat for a valve member 18.

The valve member 18 is fixed to the lower end of a shaft 19 by any suitable means such as a nut 20. The shaft 19 extends upwardly through a passageway 21 opening into the discharge chamber 16 in approximately concentric relationship with the passageway 15, and then through a chamber 22, with which the top of the passageway 21 communicates, and a gasket 23. A shoulder 24 is provided surrounding the opening of the passageway 21 into the discharge chamber 16 and serves as an upper valve seat for the valve member 18, a suitable groove being provided in the upper surface of the member 18 for cooperation with the shoulder 24.

The shaft 19 is made functionally integral with a solenoid plunger 25, the plunger being disposed in a bore 26 which is defined by a sleeve 27 and a solenoid coil 28. The solenoid plunger and valve member 18 are urged to their normal upper position, in which valve member 18 is seated against its upper seat 24, by a spring 29 disposed in a chamber 30 located at the top of the valve housing 10.

A second fuel intake or filter tube 31 is disposed rearwardly and to one side of the tube 13 and fixed in a collar 32 extending downwardly from the valve housing 10. The tube 31 is made to extend to a lower level in the tank 11 than the filter tube 13, as is illustrated in the drawing, and is provided with a filter element 32 covering the opening thereof into the tank 11.

The filter tube 31 communicates at its upper end with a passageway 33, which passageway in turn opens into the chamber 22 at the rear and to one side thereof. As will be appreciated, the position of the valve member 18 determines through which of the filter tubes the fuel will be drawn by the fuel pump into the discharge chamber 16 and the main fuel line 34. If the valve member 18 is in its upper position fuel will be drawn through the main tube 13, and if the valve member is in its lower position, fuel will be drawn into the discharge chamber 16 from the second or reserve tube 31 via chamber 22.

In order to provide an easily accessible control for positioning the valve member against its lower seat 17 and thereby establish a connection between the main fuel line 34 and the lower extending filter tube 31, a push button 35 is provided on a dashboard panel indicated generally at 36. The dashboard contains an ignition switch 37 which is connected in the conventional manner through a conductor 38 to a battery 39 which in turn is suitably grounded as shown at 40. The ignition switch is further connected in the conventional manner to an ignition coil (not shown) by a conductor 41. A conductor 42 connects the conductor 41 to a manually operable switch 43 which, when closed, may be made to establish contact through a switch spring blade 44 and a conductor 45 with a warning light 46, a suitable ground beyond the warning light 46 being provided as indicated at 47. The warning light 46 is circuited in parallel with the solenoid coil 28 and also with a holding solenoid coil 48 by means of a conductor 49.

A shaft 50 and a holding armature plate 50' are fixed to the push button 35 and extends through the holding solenoid coil 48. The push button and shaft 50 are normally urged in an outward "switch open" position, as shown, by any suitable means such as a spring 51 disposed in a chamber 52. The holding coil 48 is shown connected to a warning light 53 by a conductor 54 and 54' and the solenoid coil 28 is connected in series therewith by a conductor 55, a suitable ground beyond the solenoid 28 being provided as indicated at 56.

It should be understood that only one of the warning lights shown in FIG. 1 need be employed in the system according to the present invention, the two being shown in the circuit for purposes of illustration only. For example, if the automobile is already equipped with an existing warning light, such as an emergency brake signal light, use may be made of the same by merely suitably connecting it in parallel with the solenoid coils such as is shown with the warning light 46. In this instance no series warning light such as shown at 53 need be employed, a direct connection being made from the holding coil 48 to the solenoid coil 28. It should be noted that the use of such a parallel connected light allows for a brighter warning signal than does the use of a series connected light. However, a series light, such as that shown at 53, is preferred since it advises the driver that the system itself is in good operating condition and also reduces the cost of the solenoid windings by reducing the voltage drop through each of them. It will be appreciated that in the event only the series light is employed, the circuit is the same as illustrated, except that there would be no conductor such as shown at 45 extending from the spring blade 44 to a light such as that shown at 46.

In the operation of the system, with the fuel supply tank 11 being approximately full, for example filled to a level indicated generally at A, the valve member 18 is seated on the shoulder 24, solenoid plunger 25 being urged to its uppermost position by the spring 29. When the valve is in this normal position, fuel is withdrawn from the tank through the filter tube 13, the passageway 15 and the discharge chamber 16, and then passes through the gas line 34 and finally into the carburetor (not shown). As the fuel is burned, the level thereof in the tank 11 will drop slowly until it reaches a position such as indicated generally by the dotted line B.

When the fuel reaches level B, the fuel pump will begin to draw large quantities of air together with the fuel causing the engine to gradually lose power. The engine will miss, then regain power only to miss again over a distance of approximately one or two miles. It should be noted that this gradual reduction of power effected by the present system has been found to be an important and desirous feature thereof. For example, in the single strainer member systems previously mentioned wherein the fuel intakes are bottom mounted, the fuel cut-off is sudden. Such a sudden cut-off poses a serious problem, especially in heavy traffic, since if all the fuel available at the normal fuel level is exhausted suddenly, then the carburetor bowl, the fuel pump and the line to the fuel tank are also exhausted requiring an average of about twenty seconds for cranking to prime the system on the reserve supply. In the instant system, the missing and gradual reduction of power serves as a positive warning to even the most inattentive operator that his fuel supply is nearing exhaustion, the engine finally stalling completely unless the operator pushes the button 35.

Pushing the button 35 closes the switch 43 thereby energizing the holding coil 48, warning light 46 or 53, depending upon which is included in the particular system, and the solenoid coil 28. Upon energizing the solenoid coil 28, the solenoid plunger 25 is drawn downwardly against the action of the spring 29 causing the valve member 18 to seat on the shoulder 17 thereby closing off the passageway 15 from communication with the discharge chamber 16 and from the source of air being drawn by the fuel pump through the filter tube 13. At the same time, since the holding coil 48 is energized, it acts to hold the armature plates 50' in contact therewith and switch 43 closed.

When the valve member 18 is moved to its lower position abutting against the shoulder 17, the suction applied by the fuel pump then acts to draw fuel through the second or lower filter tube 31. The fuel is drawn through the tube 31, through the passageway 33, into chamber 22, downwardly through the passageway 21, and then outwardly through the discharge member 16 and the fuel line 34. The difference in the vertical level between the opening in the filter tube 13 and the opening in the filter tube 31 may be made so as to provide any desired quantity of reserve fuel and preferably should provide at least that quantity of fuel to enable the automobile to travel approximately 20 to 30 miles.

It will be appreciated that if the driver or operator forgets to stop for refueling in the distance that the reserve quantity of fuel will enable him to travel, but stops for any other reason, the act of turning off the ignition switch will trip the spring loaded solenoid switch 43 thereby again establishing the connection between the carburetor and the upper filter tube 13. The provision of this reset is important and is one of the features in which the present invention particularly resides. In this instance, the automobile can usually be started again but as soon as the fuel in the carburetor is exhausted the engine will once more stall and thus again warn the operator of the need for additional fuel.

The driver or operator must then again push the button 35 to reestablish the reserve fuel supply in order to obtain sufficient fuel to reach a filling station. In this respect, since the ignition must be turned off during the process of refueling, the normal fuel supply, that is, as drawn through the upper filter tube 13, is automatically reestablished. Again the importance of the provision of the reset is made apparent in that after refueling an inattentive person could easily forget to again switch to the normal supply and instead continue running on the reserve. In this case, of course, the fuel reserve system would be of no value.

It will be appreciated that considerable time may pass between periods of use of the fuel reserve system according to the invention. Accordingly, the problem of the solenoid valve member 18 sticking may be presented. In order to preclude the danger of this valve sticking in its normally upwardly urged position after such long periods of not being used, periodic operation is necessary. This is preferably accomplished automatically according to the present invention by incorporating the circuit illustrated in FIG. 2 into the fuel reserve system.

In this embodiment, the invention is shown associated with a conventional "key start" ignition switch in which a movable contact is moved by the ignition key of an automobile to a "start position." When the contact is moved to the "start position," a circuit is closed through a conventional solenoid 60 to a starter motor 61. The plunger contacts associated with the solenoid 60 are closed whenever the solenoid coil is energized. When the engine has started, the key is permitted to return to an intermediate position in which the ignition switch is closed only between the battery and the ignition circuit.

The system in accordance with this embodiment is arranged with the solenoid holding coil 48 in a parallel circuit with the starting motor solenoid 60. In this manner, the solenoid 48 will be actuated at any time the starter solenoid is actuated, the connection being from the ignition switch "start position" through a conductor 62 to a common point C from which one branch runs to the starter motor solenoid 60 and the other branch runs through a normally closed, single pole double throw switch indicated generally at 43', through the blade of the switch to the holding coil 48, and thence to the solenoid coil 28. It will thus be seen that the valve member 18 is actuated each time the car is started, but that this actuation is only momentary since the current flow through the holding coil 48 disappears as soon as the engine is started, and will not reappear until the switch 43' is closed manually as in the embodiment previously described.

As will be appreciated by those skilled in the art, the instant device provides an effective yet inexpensive reserve fuel system. The instant system may be designed and adapted for interchangeability with present and past automobile models having varying size fuel gauge flanges, thereby eliminating the necessity for a new design of a larger fuel gauge flange than is currently used. Further, although the particular embodiment illustrated shows the valve disposed in the fuel tank, it will be appreciated that such valve can be placed at any desired, convenient position between the fuel supply tank and the fuel pump. Since no separate fuel tank is employed in the instant system, a considerable expense present in many types of reserve supply systems is eliminated. As will be also appreciated, the need for such a fuel reserve and warning system has become increasingly important with the present vast amount of automobile travel done on turnpike or other limited access routes where refueling stations are often more than twenty miles from each other.

Although a warning means, such either the series connected or parallel connected light, is preferably employed in the system according to the invention, it will be appreciated that the system is fool-proof without the incorporation of such means. Such warning means may therefore be omitted if desired. In its simplest embodiment the present invention provides for a fuel reserve system comprising in combination a fuel supply tank, a first fuel intake tube in the fuel supply tank and having one end thereof opening into the tank, a second intake tube in the fuel supply tank and having one end thereof opening into the tank in a lower horizontal plane than the end of the first intake tube, and solenoid actuated valve means operatively associated with both the intake tubes for selectively enabling the withdrawal of fuel from the tank through one or the other of the intake tubes, together with a manually operated switch for actuating same.

While what has been described is considered to be the more advantageous embodiments of the invention, it is obvious that many modifications and variations can be made in form, details of constructions and arrangement of the parts without departing from the spirit and scope of the invention as those skilled in the art will readily understand, the specific embodiment disclosed being for purposes of illustration only and not to be considered limitative. Such modifications and variations are considered to be within the purview and scope of the invention as defined by the appended claims.

I claim:
1. In a fuel system for internal combustion engines, the combination comprising a fuel supply tank, a valve housing, a first fuel intake tube having one end thereof opening into said valve housing and the other end opening into said tank, a second fuel intake tube having one end thereof opening into said valve housing and the other end opening into said tank, said second intake tube opening into said tank in a lower horizontal plane than said first fuel intake tube, a solenoid actuated valve member disposed in said valve housing and normally standing in a first position in which fuel is withdrawn from said tank through said first tube and movable upon energization of a solenoid of said member between said first position and a second position in which fuel is withdrawn from said tank through said second tube, a manually operated switch in series with said solenoid actuated valve member whereby closing of said manually operated switch energizes said solenoid actuated valve member and effects movement of said valve member from said first position to said second position, a holding coil operatively associated with said manually operated switch, said holding coil being energized upon closing of said manually operated switch and being effective, when so energized, to hold said manually operated switch in its closed position, a starting motor switch, and circuit means electrically connecting said starting motor switch and said valve member for actuating said valve member when said starting motor switch is closed, whereby said valve member is actuated each time the engine is started.

2. In a fuel system for an internal combustion engine, the combination comprising a fuel supply tank, a first fuel intake tube having one end thereof opening into said tank, a second fuel intake tube having one end thereof opening into said tank, said second fuel intake tube opening into said tank in a lower horizontal plane than said first fuel intake tube, a solenoid-actuated valve member operatively associated with both said fuel intake tubes and having a first position in which fuel is withdrawn from said tank through said first tube and movable between said first position and a second position in which fuel is withdrawn from said tank through said second tube, a manually-operated switch in series with said solenoid-actuated valve, whereby actuation of said manually-operated switch effects movement of said valve member from said first position to said second position, a starting motor switch for the engine, and a separate parallel circuit around said manually-operated switch to said solenoid-actuated valve member, said separate parallel circuit being closed when said starting motor switch is closed, whereby said valve member is actuated upon each actuation of said starting motor switch.

References Cited in the file of this patent
UNITED STATES PATENTS

| | | |
|---|---|---|
| 1,437,086 | Bater | Nov. 28, 1922 |
| 1,533,082 | Alig | Apr. 14, 1925 |
| 2,745,478 | Arens et al. | May 15, 1956 |
| 2,818,915 | Pfeiffer | Jan. 7, 1958 |

FOREIGN PATENTS

| | | |
|---|---|---|
| 712,719 | Germany | Oct. 24, 1941 |